United States Patent [19]
Jenkin et al.

[11] Patent Number: 5,940,444
[45] Date of Patent: Aug. 17, 1999

[54] DARS PSF WITH NO DATA RATE INCREASE

[75] Inventors: Keith R. Jenkin, Redondo Beach; Stephen J. Toner, Pasadena, both of Calif.

[73] Assignee: TRW Inc., Redondo Beach, Calif.

[21] Appl. No.: 08/844,276

[22] Filed: Apr. 18, 1997

[51] Int. Cl.$^6$ .............................. H04K 1/10; H04L 27/28; H04L 1/02; H04B 7/02

[52] U.S. Cl. .......................... 375/260; 375/267; 375/346; 375/347; 375/299; 455/303; 455/304; 455/101; 370/345; 370/498

[58] Field of Search .................................... 375/260, 267, 375/346, 347, 299; 455/296, 303, 304, 101; 370/345, 498

[56] References Cited

U.S. PATENT DOCUMENTS

| | | | |
|---|---|---|---|
| 4,660,196 | 4/1987 | Gray et al. | 370/326 |
| 4,750,167 | 6/1988 | Meyer | 370/498 |
| 5,283,780 | 2/1994 | Schuchman et al. | 370/312 |
| 5,349,699 | 9/1994 | Erben et al. | 455/186.1 |
| 5,355,114 | 10/1994 | Sutterlin et al. | 340/310.02 |
| 5,592,471 | 1/1997 | Briskman | 455/52.3 |
| 5,646,942 | 7/1997 | Oliver et al. | 370/312 |
| 5,710,798 | 1/1998 | Campana, Jr. | 375/347 |

OTHER PUBLICATIONS

E.Y. Chen, "Digital Audio Radio–An Application of Audio Compression Technology", Proceedings of The IEEE International Conference on Industrial Technology, 1996, pp. 796–800, Dec. 1996.

Szu–Lin Su et al., "Time–Diversity Scheduled Retransmission Multiaccess Protocols for Satellite Networks", IEEE International Conference on Communications, 1991, pp. 1544–1548, vol. 3, Jun. 1991.

*Primary Examiner*—Stephen Chin
*Assistant Examiner*—Michael W. Maddox
*Attorney, Agent, or Firm*—Michael S. Yatsko

[57] ABSTRACT

A digital audio radio system that employs transmitting multiple time-separated versions or legs of the same or substantially the same source signal to accommodate signal blockage problems while using no or little additional bit data rate. In one embodiment, a first leg transmits only right channel data and a second leg transmits only left channel data when no blockage occurs, the two legs can be combined to provide a complete signal and perfect reception. If one of the legs is blocked, then a cloning technique is used to clone the existing channel as the non-existing channel to provide either a combination of two right channels or two left channels. In another embodiment, a first leg transmits a sequence of the even frames including both right and left channel data and leaves the odd frames blank, and a second leg transmits a sequence of the odd frames including both the right and left channel data and leaves the even frames blank. The combination of the two legs will provide perfect reception where no blockage occurs. If the signal is blocked, the existing frames can be repeated or interpolated to provide the non-existing frames. In another embodiment, a plurality of transmitted legs include blank frames and only right or left channel data in non-blank frames. The combination of all of the legs provides all of the digital data for perfect reception. If one or more of the legs is blocked, in the right and left channel cloning, frame repeating or interpolation can be used to replace the missing data in each frame.

28 Claims, 8 Drawing Sheets

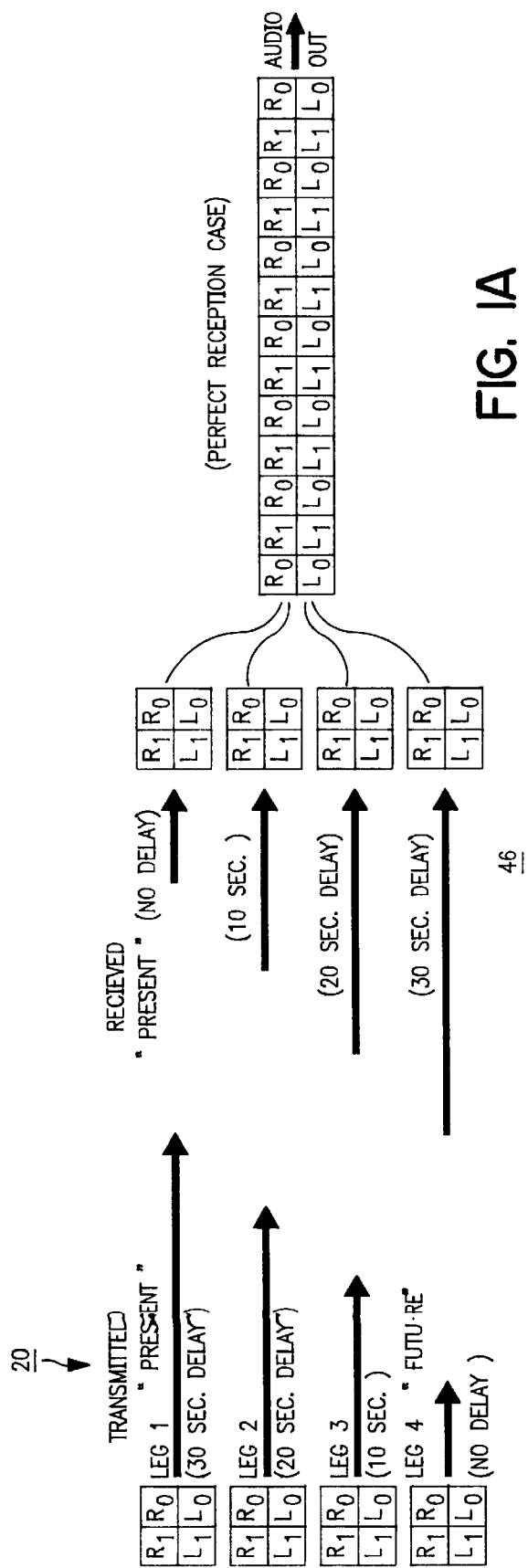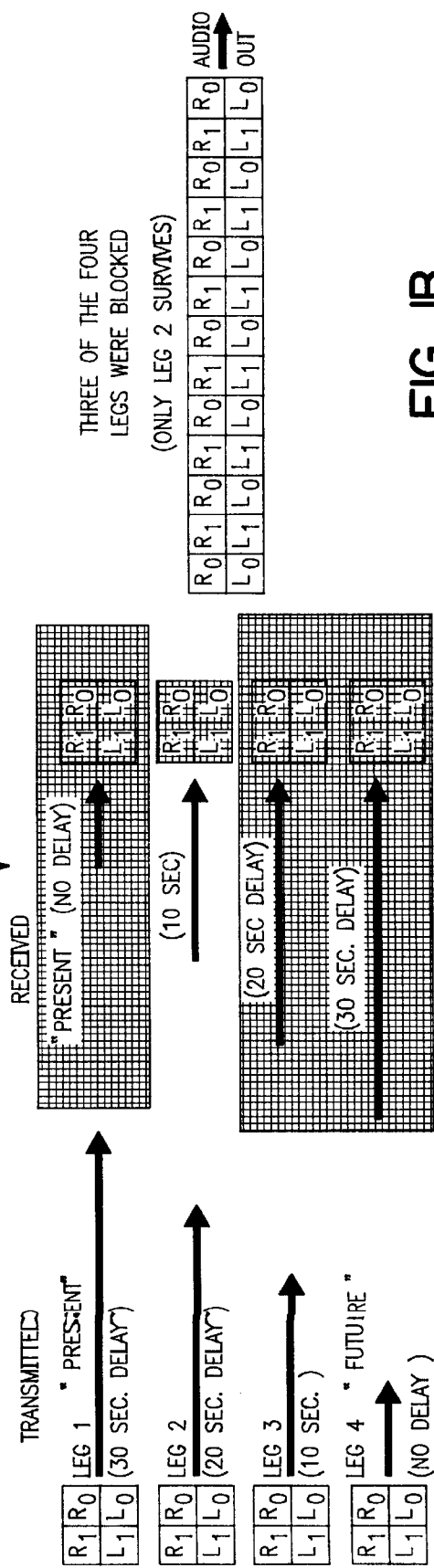
FIG. 1A
FIG. 1B

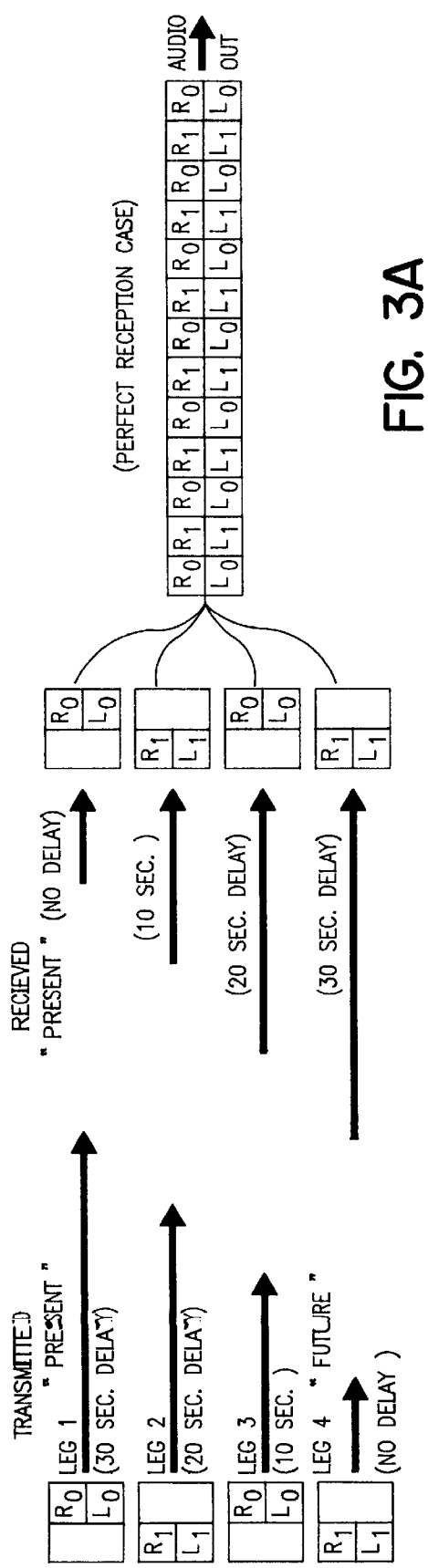
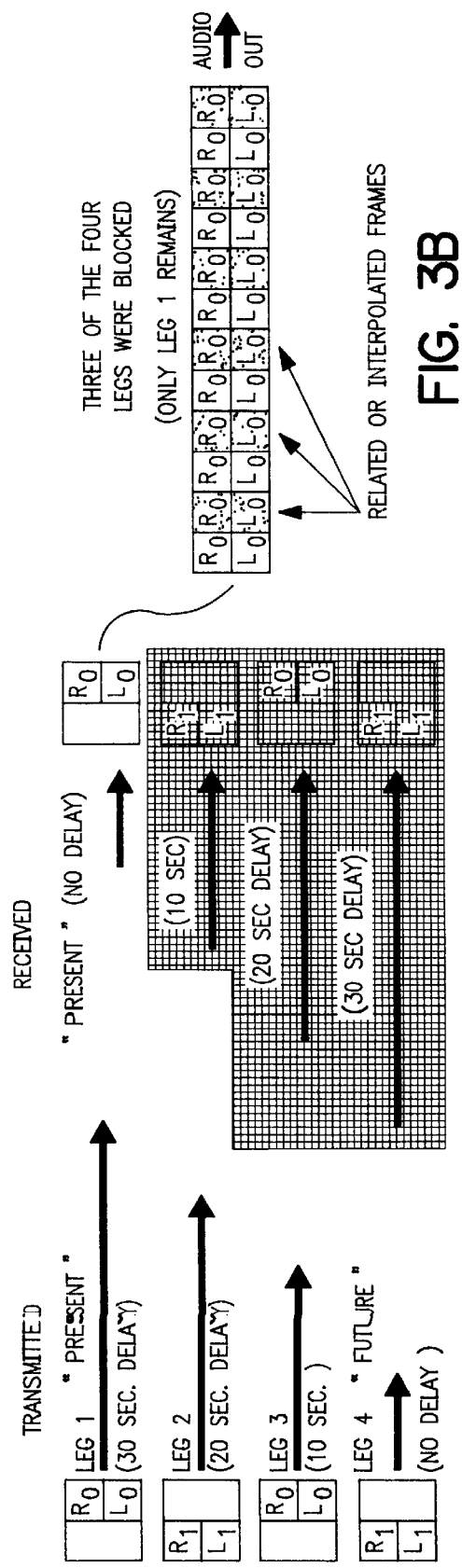

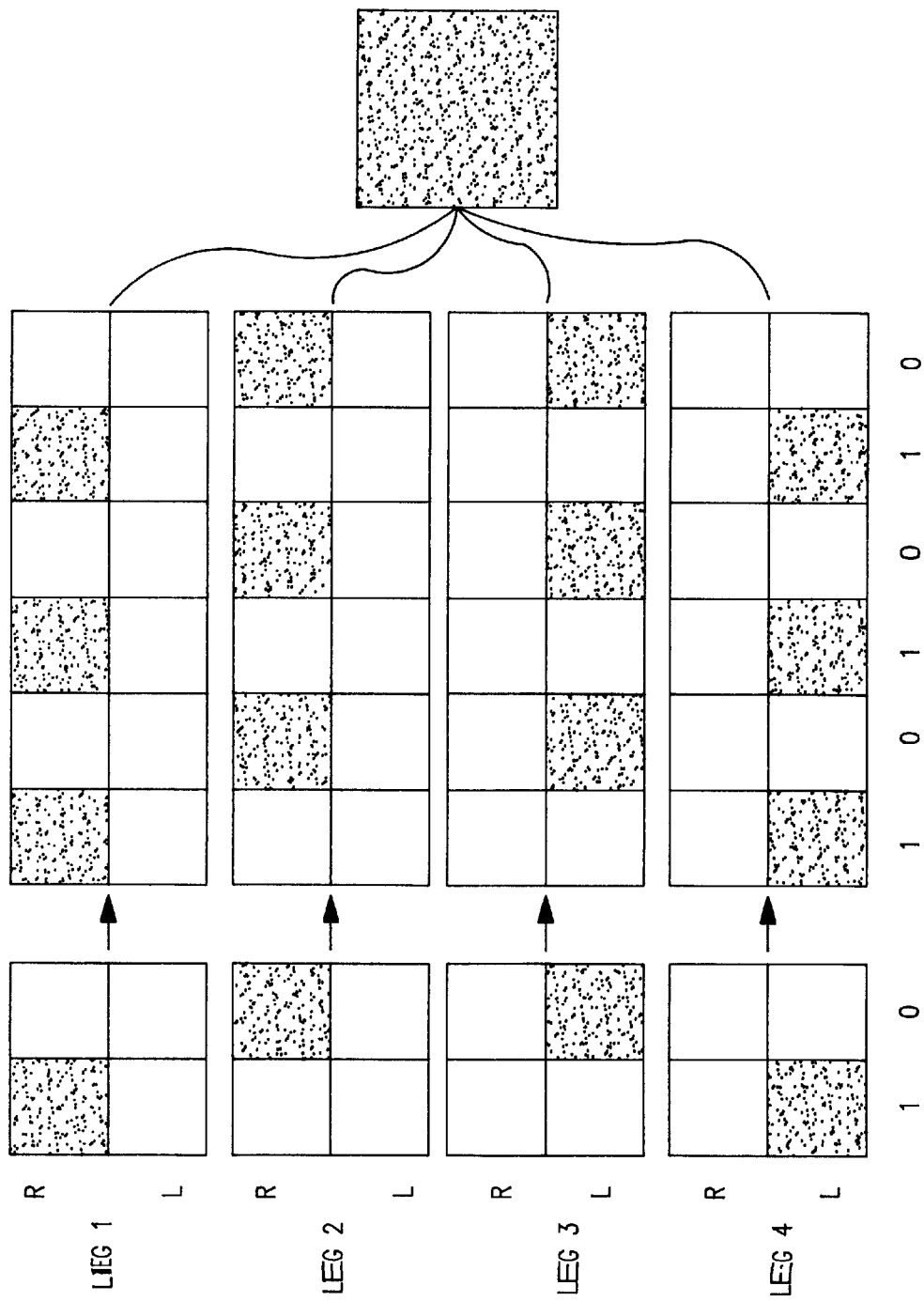

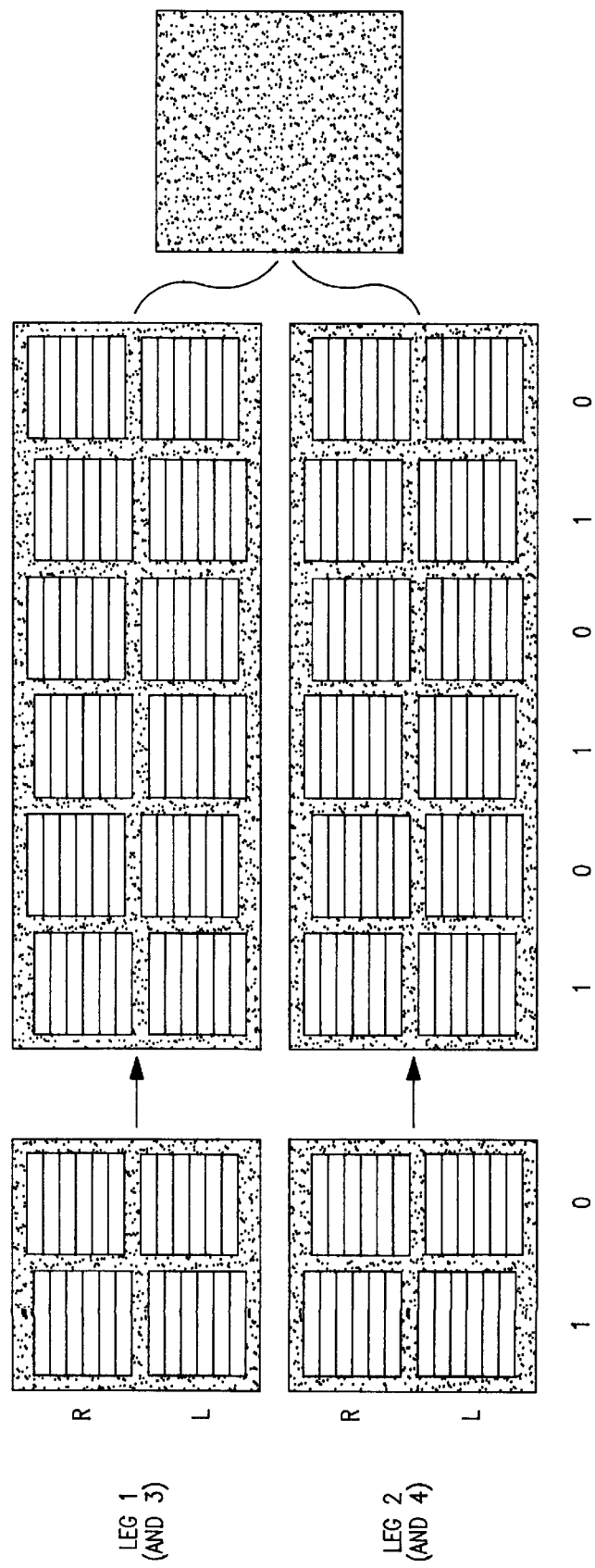

DARS PSF WITH NO DATA RATE INCREASE

BACKGROUND OF THE INVENTION

1. Field of the Invention

This invention relates generally to a digital audio radio system and, more particularly, to a digital audio radio system that incorporates a technique for eliminating or minimizing the effects of a blocked transmission without the need for additional system resources.

2. Discussion of the Related Art

State of the art technology for current radio systems includes a digital audio radio system (DARS) that generates compressed digital audio signals to be transmitted by a digital audio transmission source and reproduced in a receiver of the DARS. In the known DARS, the audio signals are generated in a broadcast studio and converted to digital data. The digital data signals are then sent to an earth based ground transmission station to be transmitted to a plurality of receivers within a reception area or to be transmitted to one or more satellites orbiting the earth in a geosynchronous orbit. The satellites then transmit the radio signals to a defined reception area over the earth.

The broadcast studio generates analog audio signals in much the same way as a conventional radio station studio. For example, an announcer provides real-time narration, and then typically plays music selections from a library of recorded music, such as compact disc (CD) music albums. The analog signals of the narrations are converted to a digital data stream using pulse code modulation (PCM). PCM is sometimes referred to as uncompressed, raw digital audio, and is a continuing, in time, sequence of regularly spaced (temporal period) digital words, for example, 16 bits of resolution for a total of 65, 536 amplitude levels. The value of each sample represents the quantized audio signal level (amplitude) at that sample's instant in time. The conversion is performed for a real-time voice or live music performances by passing the analog signals through an analog-to-digital converter (ADC). In the case of playing music CD, the analog-to-digital conversion is not necessary since the audio data is already stored in a digital format on the CD.

The PCM digital audio signal has a data rate of 44,100 samples per second (sps), 16 bit linear quantization, and stereo left and right channels. This is the data stream quality of CD music in temporal sampling resolution and amplitude resolution. This PCM digital data is then compressed by, for example, a psycho-acoustic coding (PAC) compression algorithm into a 128 kilo-bits-per second (kbps) digital signal to conserve system data throughput resources. The present ability of audio compression algorithms and the listener community consensus is that PAC compressed 128 kbps stereo is imperceptibly different than a 44,100 sps PCM signal. PAC is a type of audio compressor algorithm which preserves only those sounds important to the human ear-brain connection, and is thus efficient. In accordance with these known compression algorithms, the original audio wave by itself is not preserved and replicated, rather, key mathematical features of the wave form, such as frequency bin activity, comprise the compressed data bit stream. The compressed audio data of PAC consists of successive frames of data, each on the order of 1/30 of a second of sound. Organizations such as Dolby, MPEG, AT&T, Musicam and others have various versions of PAC algorithms, implemented in either software or hardware. A compressed data rate of 128 kbps would produce essentially the same audio quality as a music CD. For purposes of the discussion below, 128 kbps will be referred to as 100% data throughput.

For satellite systems, the digital data is sent to the earth based ground station for transmission to one or more satellites on a radio frequency "uplink" carrier. The digital data is generally compressed in the ground station. The satellite receives the signal from the ground station and then retransmits it to a defined area on the earth's surfaces where radio reception is desired. For example, the satellite can have a "downlink" beam pattern that covers the continental United States. The receiver receives the downlink signal, decompresses it and converts it back to an analog signal for both stereo channels using a digital-to-analog converter (DAC) for subsequent amplification and listening through speakers.

In the satellite based systems, certain unique problems exist if the receiver is mobile, such as a car radio. There are many sources of line-of-sight (LOS) obstructions as one drives along a typical road or highway. For example, trees attenuate the downlink signal from the satellite, and can even render it unusable if the foliage is particularly dense. Additionally, there are other sources of complete blockage of the downlink signal, such as billboards, buildings, bridge overpasses, large trucks, etc. The obstructions can be divided into two groups, those that attenuate the downlink signal, and those that completely block the downlink signal. To alleviate attenuation problems, extra signal strength can be used to "burn through" the obstruction. Additionally, schemes such as interleaving redundant digital bits so that occasional signal bit errors have an imperceptible effect, or an error-detection/correction coding can be used. As long as there is adequate signal, and adequate error correction, radio performance is generally unaffected.

For those types of objects that provide total blockage of the signal, other techniques to mitigate the blockage are required. One technique is to employ two or more identical satellites, broadcasting the same radio program material. The satellites would be positioned in their orbits so that the angle from each satellite to the user's radio would be substantially different. Thus, the chances of both signals being obscured at the same time are unlikely, and the radio operation would continue without interruption. Another approach is to provide two antennas mounted on a vehicle, one on the hood, and one on the trunk lid. Reception loss from smaller obstructions would thus be prevented because at least one antennae would be in view of a satellite as the vehicle travels.

To eliminate audio reception outages in moving vehicles when the downlink signal from the satellites is intermittently blocked by objects as the vehicle moves, it has been known to provide a time-shifted pretransmission of the signal stored in the receiver's memory to be substituted for the signal later if it is blocked. U.S. Pat. No. 5,592,471 issued Jan. 7, 1997 to Briskman, discloses a mobile radio receiver using time diversity to avoid service outages in multi-channel broadcast transmission systems. This invention uses a "substantial identical" signal pretransmission method. A digital audio signal is generated as discussed above, and split into identical first and second transmission "legs." Prior to transmission, one of the legs is delayed a predetermined time. The two legs are transmitted to one or more satellites to be retransmitted and received by a receiver. The non-delayed leg is delayed in the receiver to coincide with the delayed leg. Thus, two identical signals are received in the receiver spaced apart in time. If the signal currently being received gets blocked, the receiver can select the delayed leg already present in the receiver that was received before the signal was blocked. If a single pretransmission leg is employed, the total system data rate would be 256 kbps, or a 200% throughput because of the redundant 128 kbps transmission leg. U.S. patent application Ser. No. 08/665, 143, titled "Method And Apparatus For Accommodating Signal Blockage In Satellite Mobile Radio Systems", filed Jun. 14, 1996, assigned to the assignee of the instant invention, and herein incorporated by reference, also discloses a technique for preventing loss of signal due to blockage in a satellite DARS. This system also incorporates a pretransmission technique where a "present" data stream and a "future" data stream are time multiplexed for transmission. A buffer is employed in a pretransmitter that stores consecutive frames of digital audio signals to be transmitted in a shift register type configuration. The pretransmitter selects a future frame from an input end of the buffer and combines it with a present frame at an output end of the buffer to be transmitted as a single "leg" of the audio transmission signal. Each time the shifter register buffer shifts a frame, a new leg is generated as part of the data stream that is to be broadcast. A satellite receives the digital data stream and retransmits it over the defined area to be received by a receiver. The receiver also includes a shift register buffer that inputs the future portion of each leg at the input of the buffer. As the future portion of the received signal is shifted through the register, the future portion of the leg is the same in time as the present portion when it reaches the output of the buffer. An OR-gate selects one of either the present portion of each leg of the received signal or the future portion at the output of the buffer as the current transmission. Thus, if the signal from the satellite is blocked, and no present signal is available at the antenna of the receiver, the future portion stored in the shift register may have been stored prior to when the blockage occurred and can be used. Additionally, an intermediate leg (soon leg) can be transmitted between the future and present portions and stored in the middle of the buffer to accommodate brief occurring obstructions.

Storing pretransmitted legs to be used in the event of signal blockage is referred to in application Ser. No. 08/665, 143 as a PSF (present, soon, future) pretransmission technique. To provide PSF legs in a practical implementation having an acceptable data rate overhead, the pretransmitted legs (soon, future) can be of a lesser data quality (music replication accuracy) to save system resources (bandwidth), if the pretransmitted audio quality is user-acceptable. The invention of application Ser. No. 08/665,143 contemplates any technique in which multiple time-separated versions of the same source signal can be simultaneously transmitted and independently separated by a receiver where one or more of the versions has a lesser data quality than the version used when the signal is not blocked.

The more transmitted legs there are, the more robust the system is in accommodating physical blockage or other signal fading situations. However, the greater the digital data rate transmitted to and from the satellite, the bigger the satellite needs to be and more power is required to operate it. Thus, it is of paramount importance to conserve transmitted data rate to the extent possible. If the technique is employed where pretransmitted audio is of a lesser data rate acceptable sound quality, then the present and future pretransmitted legs might be accomplished with a 128 ksps stereo present signal, plus a 64 kbps stereo future signal. 64 kbps stereo is virtually indistinguishable in audio quality from 128 kbps stereo, except in the most ideal of listening conditions, by the most critical of listeners and is thus acceptable for system use. This would result in a data rate throughput of 150% based on (128+64)/128%.

It would be ideal if providing multiple time-separated versions of a source signal did not have an increase in bit data rate (bandwidth) over the nominal data rate needed for an acceptable audio reception. It is an object of the present invention to provide a DARS that provides a technique for providing suitable audio in the event that there is signal blockage to provide maximum pretransmitted legs while using no or little additional system resources.

SUMMARY OF THE INVENTION

In accordance with the teachings of the present invention, several techniques are disclosed for providing maximum pretransmitted legs in a DARS while using no or little additional bit data rate. Each technique of the invention incorporates transmitting multiple time-separated versions or legs of the same or substantially the same source signal where at least some of the legs include different digital data information than other of the legs. In one embodiment, a first leg transmits only right channel data and a second leg transmits only left channel data. When no blockage occurs, the two legs can be combined to provide a complete signal and perfect reception. If one of the legs is blocked, then a cloning technique is used to clone the available right or left channel as the non-existent right or left channel to provide either a combination of two right channels or two left channels. In another embodiment, a first leg transmits a sequence of the even frames including both right and left channel data and leaves the odd frames blank, and a second leg transmits a sequence of the odd frames including both right and left channel data and leaves the even frames blank. The combination of the two legs will provide perfect reception when no blockage occurs. If the signal is blocked, the existing frames can be repeated or interpolated to provide the non-existing frames. In another embodiment, a plurality of transmitted legs include blank frames and only right or left channel data in the non-blank frames. The combination of all of the legs provides all of the digital data for perfect reception. If one or more of the legs is blocked, then right and left channel cloning, frame repeating or interpolation can be used to replace the missing data in each frame. Yet another technique, referred to as splining, includes transmitting multiple legs where each channel in each leg provides part of the digital data to be combined with the missing information in another leg.

Additional objects, advantages, and features of the present invention will become apparent from the following description and appended claims, taken in conjunction with the accompanying drawings.

BRIEF DESCRIPTION OF THE DRAWINGS

FIGS. 1(A) and 1(B) depict of a four leg transmission scheme at a nominal 400% full data rate showing blocked and unblocked legs;

FIGS. 3(A) and 3(B) depict an even and odd frame replacement scheme according to another embodiment of the present invention for a four leg transmission scheme at a nominal 200% data rate showing unblocked and blocked legs;

FIG. 5 depicts another zippering technique according to another embodiment of the present invention including a different zipper pattern; and FIGS. 6(A), 6(B) and 6(C) show three depictions of a splining technique for transmitting digital data, according to another embodiment of the present invention, for four transmission legs, and a 100% data rate throughput.

DETAILED DESCRIPTION OF THE PREFERRED EMBODIMENTS

Figure 2A:
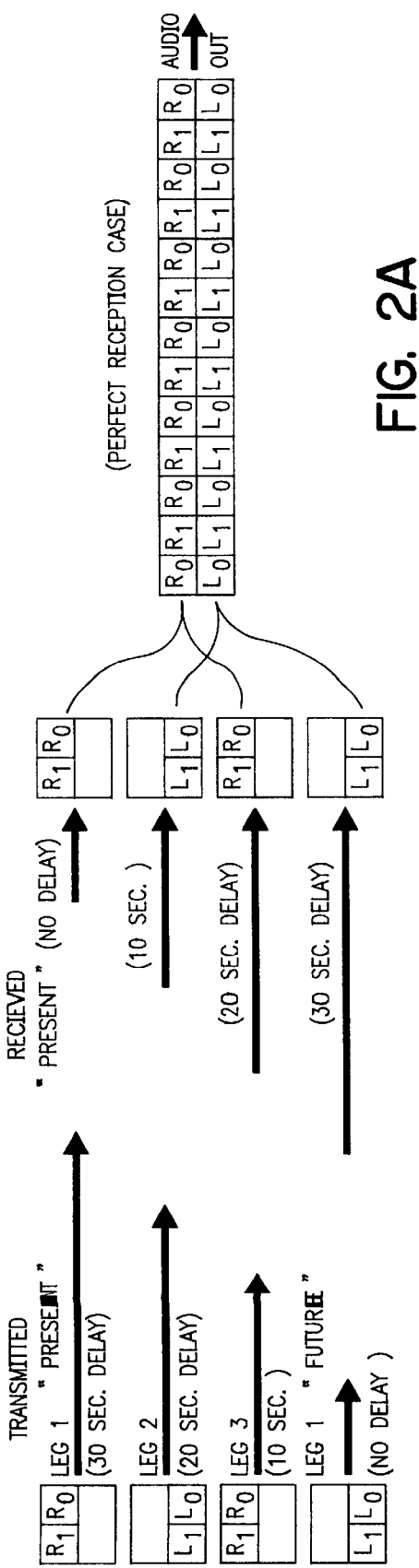
FIGS. 2(A) and 2(B) depict a right channel and left channel cloning technique, according to an embodiment of the present invention, for a four leg transmission scheme at a nominal 200% data rate showing unblocked and blocked legs.

The following discussion of the preferred embodiments is directed to a technique for providing multiple, delayed pretransmitted legs in a DARS is merely exemplary in nature, and is in no way intended to limit the invention or its applications or uses.

The present invention pertains to techniques for transmitting multiple time-separated versions of the same source signal without increasing, or nominally increasing, the system digital data rate. In other words, the invention sets out various techniques for providing multiple time-separated versions of the same or substantially the same digital data signal to eliminate or reduce physical blockage problems probable in a DARS, and is able to do this at the same 100% data rate throughput as a system having a single digital data transmission, that is, a system that does not have multiple time-separated versions of a source signal. The key to the present invention is to provide multiple time-separated versions or transmission legs where the legs have different signal information, as opposed to the inefficient and redundant transmissions of "substantially the same" signals discussed in the background discussion above. In the redundant "substantially the same" transmission techniques, each signal can readily be substituted as needed to provide continuous audio output, but the same data rate overhead is enormous and essentially economically impractical in a real application. If four "substantially the same" pretransmitted legs were used, then a large system data rate throughput of 400% is required.

FIGS. 1(A) and 1(B) depict an operation of transmitting four separate legs of the same compressed digital data, where each leg is delayed relative to the other legs. Leg 1 is a "present" leg and leg 4 is a "future" leg in accordance with the PSF scheme. Four legs are being used by way of a non-limiting example in that other numbers of legs, such as two legs or six legs, could be used for a particular application depending on the expected blockage situations. The individual delay systems 20 depicted here show delays of zero seconds, ten seconds, twenty seconds and thirty seconds. In a practical environment, the delays would not be symmetric in this nature. Depending on the particular environment, delays of zero seconds, seven seconds, twenty-five seconds and three minutes may be applicable. In this example, each of the legs includes consecutive compressed digital data frames, where each frame includes right (R) channel data and left (L) channel data. In this depiction, a first frame $R_0$, $L_0$ is shown, followed by a next frame $R_1, L_1$. The particular compression algorithm used to compress the digital data into the frames would also distinguish the right and left channels.

FIGS. 1(A) and 1(B) depict the delay applied to each leg in both the transmitter and the receiver such that each leg is aligned in time in the receiver. The delays of ten seconds, twenty seconds and thirty seconds are also shown as non-limiting examples. The "present" leg 1 has the longest delay in the transmitter and is not delayed in the receiver, and the "future" leg 4 is not delayed in the transmitter and is delayed the most in the receiver. Because there are four legs, if each leg had a full data rate of 128 kbps, there is a 400% nominal data rate throughput. Of course, legs 2, 3 and 4 can be of a lesser data quality, such as 32 kbps, or other levels of quality, as these are the legs that are intended to be used in the event there is a blockage.

FIG. 1(A) shows the case where the signal transmitted from the satellite is not blocked, and all of the legs are available to be used in the receiver. Thus, the receiver would select the frame with the highest quality, usually the present leg 1. FIG. 1(B) shows an example where leg 1, leg 3 and leg 4 are not available because the transmitted signal from the satellite was blocked at the particular times those legs were being received. In this example, the receiver would select the second leg, and thus perfect reception would be maintained. It is noted that in almost every environment, having three of the four legs blocked at any particular time would be unusual.

A first technique of minimizing data rate throughput and still providing optimal signal quality in the event of a blockage, according to the present invention, is referred to as right/left channel isolation/cloning. As discussed above, and as is well known in the art, stereo audio consists of distinct right and left channels. In CD PCM, the right and left channels are generally two totally isolated waveform representations. For most compression algorithms, a "joint stereo" is generally provided where a single frame of compressed data, 16 bits, the smallest individual unit, at 128 kbps, typically about 1/30 of a second of sound, contains both the right and left audio channels. Other compression algorithms accurately preserve the right and left audio isolation, and result in individual right and left channel frames, each containing approximately one-half the number of bits as a single joint stereo frame of the same bit rate (audio quality). For example, a right channel at a data right of 64 kbps and a companion left channel at a data rate of 64 kbps. When the frames from these two 64 kbps channels are played back synchronously, perfect stereo results at an approximate equivalent of 128 kbps joint stereo. The preferred quality of isolated 64 kbps right and 64 kbps left as opposed to 128 kbps joint stereo compression is somewhat debatable. Some listeners claim true isolation is better, while other listeners claim joint stereo is better since some right and left channel information can be shared, such as omnidirectional sub-base sounds, making more data at a given data rate available for higher frequency representation improvement. The difference is truly subtle, and in fact undetectable to a majority of listeners. Thus, for the purposes here, 64 kbps right channel plus 64 kbps left channel is assumed to be equivalent to 128 kbps joint stereo.

For the right/left channel isolation/cloning technique of the invention, consider a system which transmits a present (no delay) 64 kbps right channel signal and a delayed 64 kbps left channel signal. If no blockage is encountered, perfect 128 kbps-equivalent stereo sound results. The system throughput is still 100%, the same as a single 128 kbps stereo transmission. When a blockage occurs in either signal, however, it would be expected that the resulting audio in the corresponding right or left channel would drop out, which is undesirable and almost as unacceptable as total drop outs. If simple circuitry is employed in the receiver to temporarily clone the left channel as the right channel if the right channel drops out, or temporarily clone the right channel as the left channel if the left channel drops out, the result is an occasional substitution of right channel for left channel, or left channel for the right channel. Listening tests indicate that the resulting audio quality reduction is unnoticeable in most cases for reasonable periods of time for most kinds of music. Prolonged periods of cloning are of course noticeable, but far superior to incurring complete loss of audio.

Figure 2B:
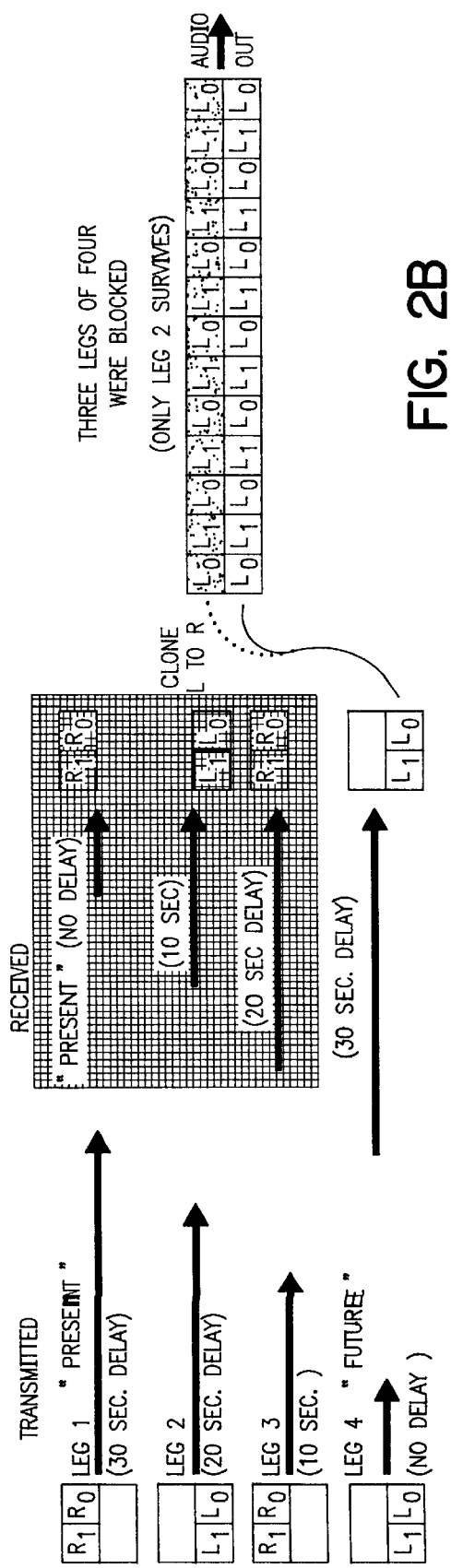

FIGS. 2(A) and 2(B) show an example of a right/left channel isolation/cloning technique of the invention. As above, four legs are transmitted where each leg is delayed some amount relative to the other legs. In this example, the first and third legs continuously transmit successive right channels $R_0$ and $R_1$ at different times, and the second and fourth legs continuously transmit successive left channels $L_0$ and $L_1$ at different times. This example gives a 200% nominal data rate, i.e., 64 kbps for each leg totaling 256 kbps. Thus, in the receiver, two sets of right channel data is available and two sets of left channel data is available if no blockage is occurring. FIG. 2(A) shows the case where no blockage is present, and all of the legs are being received in the receiver. Therefore, the receiver 46 can select one of the right channels from the legs 1 and 3, or one of the left channels from the legs 2 and 4 to be combined to provide a perfect audio signal. The redundant leg can be of a lesser data quality than the other same leg.

FIG. 2(B) depicts an example where the first, second and third legs are blocked so that only the fourth leg having the consecutive left channels is available. For the period of time that the legs are blocked, the left channel is "cloned" into the right channel to make complete digital data frames including two left channels. Of course, if both of the left channels were blocked, then the right channel would be cloned to provide complete data frames of two right channels. Simple circuitry can be employed in the receiver 46 to perform this function, or the cloning technique can be provided in software, as would be well understood to those skilled in the art. Although a continuous transmission of two left channels or two right channels would be noticeable to the listener, limited blockage times would not reduce the quality of the audio signal significantly, and is better than having no left or no right channel. If the transmission is blocked, but there is still a right leg and a left leg left, then of course the audio out would still be perfect with left and right channels for each frame. Therefore, depending on which of the legs are blocked, determines whether the audio output will be perfect, or be made up of two right channels or two left channels. It is stated once again that the use of four legs is by way of a non-limiting example as being the optimum number of legs for a typical environment. If only two legs were used, one transmitting the right channel data and one transmitting the left channel data, the same cloning concept could be implemented if one of the legs were blocked, and the system data rate throughput would be 100%.

A technique of concealing missing frames according to the invention includes repeating the previous frame when a next frame is missing, a technique commonly implemented by the makers of PAC decoders. Latency is referred to as a system time delay from when the audio signal is ready for transmission, to when it is actually reproduced for listening in the receiver. There are usually several contributors to latency within an end-to-end DARS system. In a broadcast-only system such as DARS, latency is typically not a concern and is acceptable for most program material. It is possible to add a pipeline-buffer to a DARS radio, such that the PAC decoder could look both before and after a missing frame, and thus do a better job of concealing missing data instead of simply repeating the previous frame. In fact, if before and after frames are available in a pipeline buffer, it may be reasonable to accommodate two or more missing frames in a row. Further, if the pipeline buffer spans several frames, an autocorrelation process could be done. Music typically has a lot of periodicity, so instead of merely mathematically filling in the missing frames, the missing frames could be replaced with those having a similar rhythmic temporal position. Similarly, human speech exhibits substantial periodicity, repetitiveness, and coherency. The fundamental frequency tends to slowly transition from one voiced phoneme to the next, again leaving itself to pattern recognition and replacement.

PAC audio compression frames can be configured as stand-alone chunks of data. That is, a single frame can completely represent its own time-slot of audio, without depending on any information from prior frames. Furthermore, PAC decompression algorithms typically have an internal method of dealing with missing frames of data, usually due to noise contamination. In one example, a frame may be discarded if errors are detected within it, using a technique such as cyclic-redundancy-check (CRC). CRC is a standard technique of error detection used in digital systems. With very little additional data added to a block of data, a highly reliable method of detecting bit errors within the block is possible. In the simplest case, if a missing frame is encountered, the decompression algorithm can repeat the previous frame, and the result is essentially unnoticed by the listener. Actually, more complicated missing-frame concealment methods are employed by PAC algorithms to further mask missing data.

A technique of minimizing blockage problems including concealing missing frames with no or limited data overhead, according to another embodiment of the invention, is referred to here as an even/odd/nth zero overhead technique. For an example of the even/odd/nth technique, consider two transmitted bit streams a first (present) leg consisting of 128 kbps stereo, but only the even-numbered frames (every other frame), and a second (future) leg also consisting of 128 kbps stereo, but only the odd-numbered frames, in a time sequence. The actual transmitted data rate of each leg is really only 64 kbps instead of 128 kbps. When the received legs are interwoven to produce a constant sequence of 128 stereo frames, perfect CD-quality audio is reproduced, but at a system throughput of only 100%. If one of the legs drops out due to physical blockage, the PAC decoder will continue to produce acceptable audio by "concealing" every other missing frame by repeating the previous frame or by a more complicated method as discussed above.

This concept can be extended to a longer sequence of frames within the legs. For example, consider four separate legs, each transmitting 128 kbps stereo frames, but each sending only every fourth frame. If the normal frames are in the sequence of 0, 1, 2, 3, then the first leg would send only the zero's frames in the sequence, the second leg would send only the three's frames, the third leg would send only the 2's frames, and the fourth leg would send only the 3's frames. When reassembled at the receiver, the 0, 1, 2, 3 frame sequence produces perfect 128 kbps audio. If one, two or even three of the four legs is blocked, missing-frame concealment methods discussed above would be used to provide continuous audio output. Note that the system data rate again remains 100% throughput (no overhead), yet now there are four legs of varying delays, a powerful system for accommodating physical blockage. The practicality of filling large portions of blocked frames in this example, up to three successive missing frames, depends strongly on the concealment acceptability of a particular PAC algorithm. If this technique were used in purely the PCM domain, a four times data reduction is quite acceptable. That is, the nominal 44 ksps of music CD's divided by four, or 11 ksps, which is still rather high quality digital music.

FIG. 3(A) and 3(B) show an example of an even/odd concealment technique according to another embodiment of the present invention. In this example, the legs 1 and 3 transmit the even frames $R_0$, $L_0$, but do not transmit the following odd frames $R_1$, $L_1$. Thus, these legs transmit every other frame. Likewise, the legs 2 and 4 transmit the odd frames $R_1$, $L_1$, but do not transmit the even frames, $R_0$, $L_0$ for a 200% nominal data rate throughput. FIG. 3(A) shows the example where none of the legs are blocked and are all available in the receiver. The receiver 46 can combine desired legs for perfect reception. The legs 1 and 2 or 1 and 4 can be combined to provide perfect reception, or the legs 2 and 3 or 3 and 4 can be combined to provide perfect reception if none of the legs are blocked. The redundant legs can be of a lesser data quality than the other leg with the same information.

FIG. 3(B) shows the situation where the legs 2, 3 and 4 are all blocked so that only the even frames $R_0$, $L_0$ are available in the first leg. Of course, if only one of the legs 2 and 4 were available, then only the odd frames $R_1$, $L_1$ would be available every other frame. According to this technique of the invention, the $R_0$, $L_0$ frames are repeated every other frame so that there are no frames that do not have any audio output. Different techniques can be used to provide these repeated frames, as discussed above, including repeating the frame immediately preceding the missing frame, repeating the frame immediately following the missing frame, or interpolating the frames on either side of the missing frame, until the blockage has passed. Simple circuitry or suitable software could easily be made available to repeat the previous or following frames to provide the missing frames, as would be well understood to those skilled in the art. Additionally, many interpolation techniques for interpolating a missing frame by using previous and past frames would also be well understood to those skilled in the art.

Figure 4A:
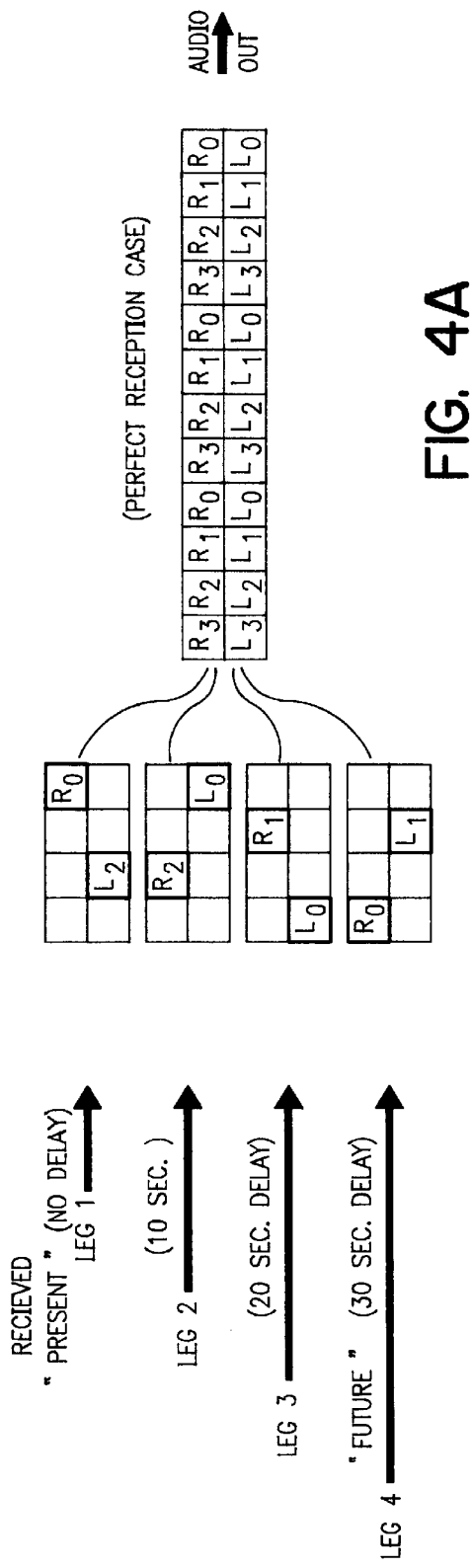
FIGS. 4(A) and 4(B) depict a zippering technique according to another embodiment of the present invention for a four leg transmission scheme at a nominal 100% data rate showing unblocked and blocked legs.
Figure 4B:
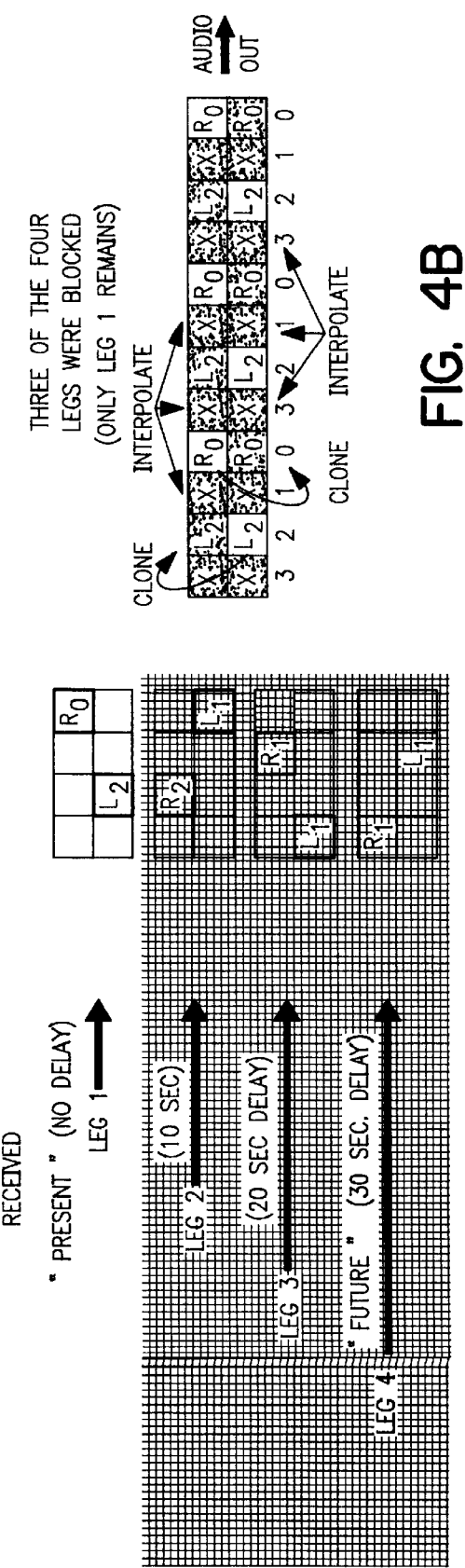

For additional performance (more legs for more robust blockage-caused-audio-dropout immunity), it is possible to combine the methods described above. FIGS. 4(A) and 4(B) show an example of a zippering technique according to another embodiment of the present invention. The term "zipper" is used since the frames intermingle/mesh something similar to the teeth in a zipper. In these figures, the transmitter portion has been eliminated, but it will be understood from viewing the previous figures that the four legs are delayed in the same manner. The first leg consecutively transmits the sequence of the even right channel $R_0$, a skipped frame, the odd left channel $L_2$ and a skipped frame. The second leg consecutively transmits the sequence of the left channel $L_0$, a skipped frame, the right channel $R_2$ and a skipped frame. The third leg consecutively transmits the sequence of a skipped frame, the right channel $R_1$, a skipped frame and the third channel $L_3$. The fourth leg consecutively transmits the sequence of a skipped frame, the left channel $L_1$, a skipped frame, and the right channel $R_3$. Thus, when no blockage occurs, the combination of each of these legs can be combined (zippered) to give perfect reception as shown in FIG. 4(A). When the four legs are combined/interwoven in the receiver, perfectly reconstructed 128 kbps stereo is again produced, yet still at the baseline 100% throughput. If more legs are transmitted, then each leg can transmit a lesser number of right or left channels.

FIG. 4(B) shows the example where legs 2, 3 and 4 are blocked, and only the digital data of leg 1 is available, $R_0$ of the first frame and $L_2$ of the third frame. Of course, if less than three legs are blocked, then more information is available to recreate the complete signal. The various cloning and concealment algorithms discussed above can be used so that the missing data and data frames can be reproduced from the existing data to produce the complete signal. For example, the $R_0$ and $L_2$ channels are cloned to complete the $R_0$, $R_0$ frame and the $L_2$, $L_2$ frame, and the missing second and fourth frames are filled by interpolation of the available $R_0$ and $L_2$ data. Of course, if other legs are available, or only one of another leg is available, then the cloning and interpolation will take place accordingly as necessary. The advantage of this zippering example is that even if three of the four legs are blocked, the remaining good leg will produce a pattern such that missing frames always have either one or two "good" adjacent frames to either replicate from (clone) or interpolate between, resulting in optimum audio quality. Note also that the resulting audio in this extreme blockage stress case is more of a monophonic sound as opposed to a single-sided bias of simple cloning. (Listening tests indicate this is preferable.) There are other forms (patterns) besides this example that could be used within the scope of the invention, as would be appreciated by those skilled in the art.

FIG. 5 depicts another zippering technique according to another embodiment of the present invention including a different zipper pattern.

Splining is a technique, according to the invention, for improving the reproduced audio quality when the data stream has been "patchworked" as in the case in the above-described methods. The PAC compression and coding process has to be configured to produce frames which span more than their nominal temporal or channel allotment. When the final reconstructed audio is produced, perfect 128 kbps stereo results if there are no missing frames. If, due to blockage or some other reason like a random BER (bit error rate), there are missing frames, a splined-frame architecture will produce superior audio over merely cloning, repeating, interpolating or other methods of accommodating missing frames.

In a simple splining example, first consider a two leg system. The first leg transmits only even stereo frames at 128 kbps compression (64 kbps actual data rate), and the second leg transmits only odd frames at 128 kbps compression (64 kbps actual data rate). If the odd frames are missing, then they can be filled with preceding repeated even frames or a temporal fore/aft interpolation, as previously described.

Now consider a two leg system where each leg contains frames covering the same contiguous time slots (instead of each having even/odd time slots). However, the data in each leg's frame is different, and each holds about one-half of the nominal un-splined data quantity, for example, each has an effective data rate of 64 kbps, for again only a 100% system data rate throughput. Although the data in each leg's frame covers the same time slot, the frames from each leg are complimentary, but have stand-alone capability at somewhat reduced fidelity. In other words, if the frames from both legs for a given time slot are good, then the audio produced is "perfect" 128 kbps stereo when the data is recombined. If only one leg's frames are good (the other leg is blocked), then the audio time slots are all still filled (no frame repetition or interpolation is needed), but with data that produces audio approximately the same as 64 kbps stereo. Splining does not require post-facto mathematical estimation when missing data is encountered for hole-filling. The resulting audio from splining is probably of better quality, and the receiver computational resources needed are much less.

Splining is possible to implement since PAC algorithm data frames consist mostly of a string of filter/function-generator values (parameters, coefficients) for a large bank of oscillators/filters to synthesize the original audio for a frame. For the simple two-legged example being discussed herein, suppose that each leg had filter/function data for alternating oscillators/filters. Each frame holds only a fraction of the total possible parameters, but enough such that an isolated frame could produce acceptable audio spanning the whole time slot. When there is no blockage, the full, entire array of oscillators/filters is exercised.

FIG. 6(A) shows an example of right/left splining, according to the invention where each left and right channel of each frame include horizontal slices of data. This example shows the receiver end, where the first and third legs transmit the same one-half portion of the digital data in the $R_0$, $L_0$ frame, and an opposite one-half portion of the same digital data in the $R_1$, $L_1$ frame as shown. The second and fourth legs transmit the same one-half portion of the digital data in the $R_0$, $L_0$ frame as is transmitted in the $R_1$, $L_1$ frames in the first and third legs, and the same one-half portion of the digital data in the $R_1$, $L_1$ frames that was transmitted in the $R_0$, $L_0$ frames in the first and third legs. Thus, if none of the legs are blocked, the complete data can be recreated by combining legs 1 and 2, legs 1 and 4, legs 2 and 3, or legs 3 and 4. If one or more of the legs is blocked, the legs can be combined to provide the most data that is available, either complete 128 kbps or 64 kbps.

Figure 6B:
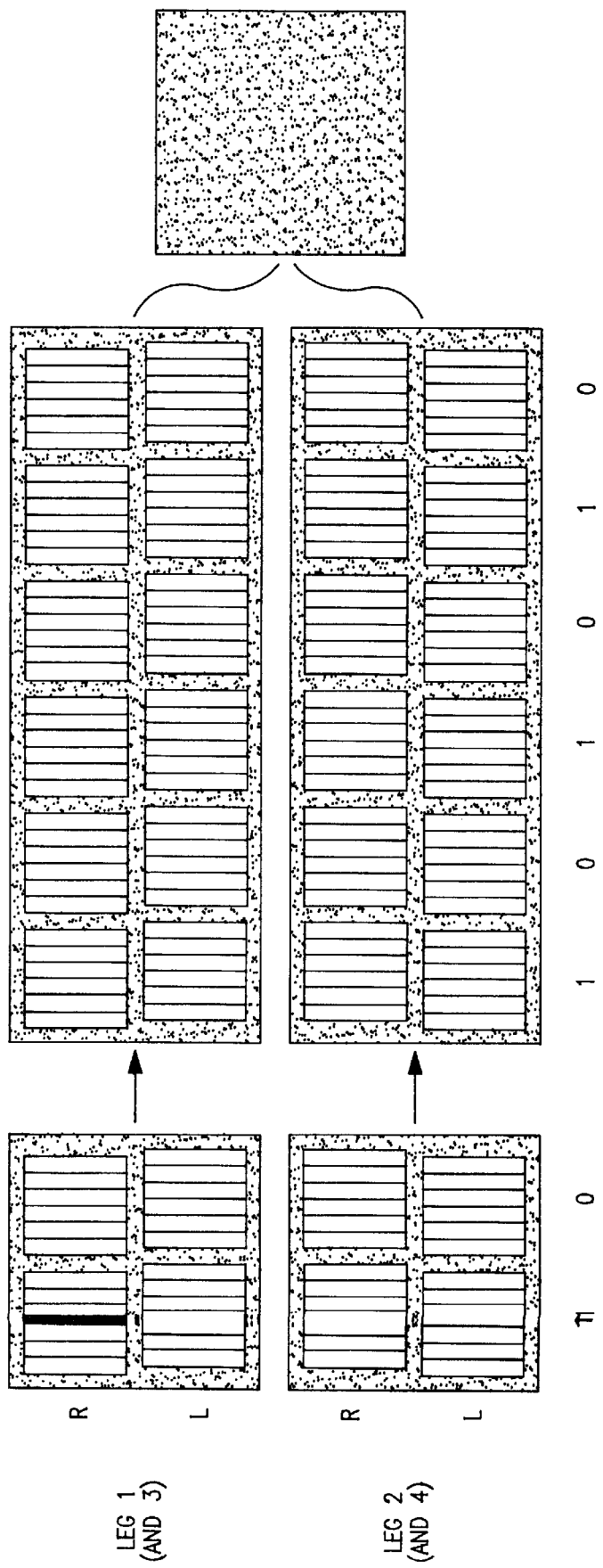

FIG. 6(B) discloses an even/odd type splining, according to the invention, where each left and right channel of each frame includes vertical slices of digital data. The first and third legs include the identical data sequence where a one-half portion of the same digital data is provided in the right channel of the legs 1 and 3 and the left channel of the legs 2 and 4, and the other one-half portion of the same digital data is provided in the left channel of the legs 1 and 3 and the right channel of the legs 2 and 4. If no legs are blocked, then the right channel of the first leg can be combined with either the right channel of the second or fourth legs, or the right channel of the third leg can be combined with the right channels of either the second or fourth legs to provide a complete right channel. Likewise, the left channel of the first leg can be combined with the left channel of the second or fourth legs, or the left channel of the third leg can be combined with the left channel of the second or fourth legs to provide a complete left channel. If one or more of the legs are blocked, the PAC algorithms can select the data that is available to provide the complete signal or one-half of the complete signal (64 kbps).

Figure 6C:
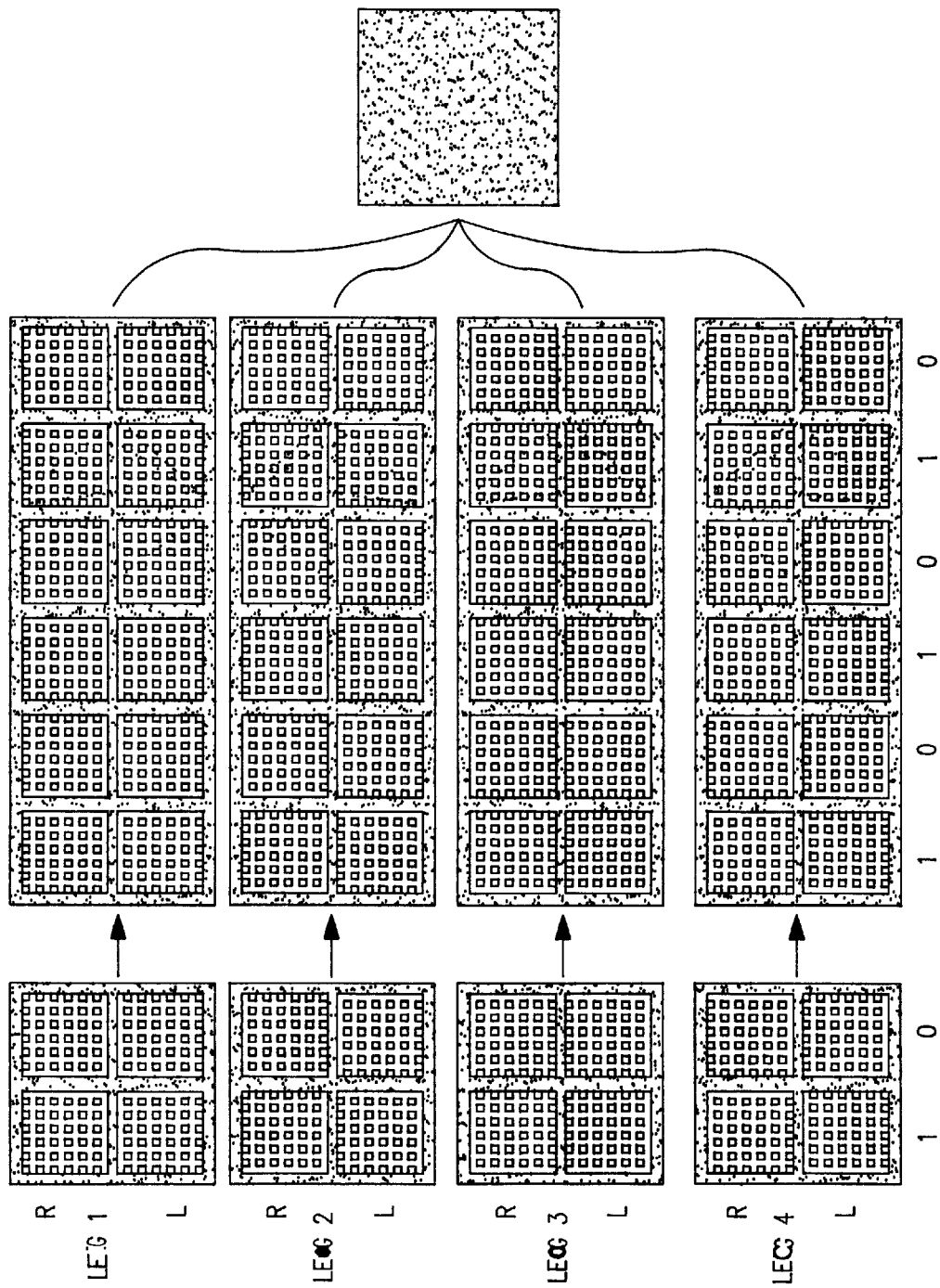

FIG. 6(C) shows another example of splining applied to the zipper pattern of FIG. 5 where each left and right channel includes a matrix of digital data. One of the right or left channels of consecutive frames $R_0$, $L_0$ and $R_1$, $L_1$ in one leg includes the same digital data as one of the right or left channels of consecutive frames $R_0$, $L_0$ and $R_1$, $L_1$ in another frame. Particularly, the digital data in the $R_0$ channel of leg 1 is the same as the digital data in the $R_0$ channel of leg 2, the $R_1$ channel of leg 3, and the $L_0$ channel of leg 4; the $R_1$ channel of the leg 1 is the same as the $L_1$ channel of the second leg, the $R_0$ channel of the third leg and the $R_1$ channel of the fourth leg; the $L_0$ channel of the first leg is the same as the $R_1$ channel of the second leg, the $L_1$ channel of the third leg, and the $L_1$ channel of the fourth leg; and the $L_1$ channel of the first leg is the same as the $L_0$ channel of the second leg, the $L_0$ channel of the third leg, and the $R_0$ channel of the fourth leg. The various legs can be zippered together accordingly to make a complete data frame when no blockage occurs, and can be used accordingly when one or more of the legs is blocked.

The foregoing discussion discloses and describes merely exemplary embodiments of the present invention. One skilled in the art will readily recognize from such discussion, and form the accompanying drawings and claims, that various changes, modifications and variations can be made therein without departing from the spirit and scope of the invention as defined in the following claims.

We claim:

1. A method of transmitting a source signal to a mobile receiver, said method comprising the steps of:

converting the source signal to a digital representation of the source signal that includes a digital data stream having consecutive frames of a complete digital data signal where each frame includes a separate right channel and left channel and includes a plurality of digital data bits representing the source signal for a certain period of time;

creating multiple versions of the digital representation of the source signal and separating the multiple versions in time, wherein at least two of the versions of the source signal provide partial and different digital data information of the complete digital data signal;

transmitting the multiple versions of the source signal so that the transmitted multiple versions are separated in time from each other;

receiving each of the transmitted multiple versions of the source signal in a receiver and delaying the multiple versions in the receiver so that each version is aligned in time;

combining the at least two versions of the source signal to form the complete digital data signal if the transmitted multiple versions are not blocked; and reconstructing the complete digital data signal by using one of the at least two versions of the source signal to replace missing frames or channels in the complete digital data signal if one or more of the transmitted multiple versions are blocked.

2. The method according to claim 1 wherein the step of reconstructing the complete digital data signal includes cloning a left channel to be a right channel if the right channel is missing and cloning a right channel to be a left channel if the left channel is missing.

3. The method according to claim 1 wherein the step of reconstructing the digital data signal includes repeating available frames of digital data to replace a frame that is missing.

4. The method according to claim 1 wherein the step of reconstructing the digital data signal includes interpolating available frames of digital data to replace a frame that is missing.

5. The method according to claim 1 wherein the step of creating multiple versions of the source signal includes creating a first version of only even numbered frames with odd numbered frames missing and a second version of only odd numbered frames with the even numbered frames missing, and wherein the step of reconstructing the digital data signal includes using the odd numbered frames to provide the even numbered frames if the first version is blocked, and using the even numbered frames to provide the odd numbered frames if the second version is blocked.

6. The method according to claim 1 wherein the step of creating multiple versions of the source signal includes creating a first version including consecutive frames of only right channel digital data and a second version including consecutive frames of only left channel digital data, and wherein the step of reconstructing the complete data signal includes cloning a left channel to be a right channel if the first version is blocked, and cloning a right channel to be a left channel if the second version is blocked.

7. The method according to claim 1 wherein the step of creating multiple versions of the source signal includes creating four versions of the source signal, where each version includes providing a repetitive sequence of four frames of digital data, wherein a first version includes a first frame with only right channel digital data, a second frame with no digital data, a third frame with only left channel digital data and a fourth frame with no digital data; a second version includes a first frame of only left channel digital data, a second frame of no digital data, a third frame of only right channel digital data and a fourth frame of no digital data; a third version includes a first frame of no digital data, a second frame of only right channel digital data, a third frame of no digital data and a fourth frame of only left channel digital data; and a fourth version includes a first frame of no digital data, a second frame of only left channel digital data, a third frame of no digital data and a fourth frame of only right channel digital data, wherein the step of combining the at least two of the versions of the source signal includes combining all four versions of the source signal to the complete digital data signal, and wherein the step of reconstructing the complete digital data signal includes using the available right or left channel digital data to replace missing frames or channels if one or more of the versions is blocked.

8. The method according to claim 1 wherein the step of creating multiple versions includes creating at least four versions where the digital data information in each version is one-fourth of the total digital data in the complete digital data signal.

9. The method according to claim 1 wherein the step of creating multiple versions of the source signal includes creating frames of digital data where each frame includes right channel digital data and left channel digital data and wherein for each frame the digital data in each right channel and left channel is about one-half of the total digital data for the channel.

10. The method according to claim 9 wherein the step of combining the multiple versions includes providing complete right channel and left channel digital data in each of the frames, and the step of reconstructing the complete digital data signal includes using the one-half of the digital data as the complete signal if one of the versions is blocked.

11. The method according to claim 1 wherein the step of creating multiple versions of the source signal includes creating frames of digital data where each frame includes right channel digital data and left channel digital data, and wherein the digital data in each right channel and left channel is about one-quarter of the total digital data for the channel.

12. The method according to claim 1 wherein the step of creating multiple versions of the source signal includes creating at least two versions of the source signal to have different levels of digital data quality, where the digital data quality is defined as a data bit rate over time.

13. A system for transmitting a source signal to a mobile receiver, said system comprising:
a transmitter, said transmitter including means for converting the source signal to a digital representation of the source signal that includes a digital data stream having consecutive frames of a complete digital data signal where each frame includes a separate right channel and a left channel and includes a plurality of digital data bits representing the source signal for a certain period of time, said transmitter further including means for creating multiple versions of the digital representation of the source signal, wherein at least two versions of the source signal provide partial and different digital data information of the complete digital data signal, said transmitter further including means for separating the multiple versions in time, said transmitter transmitting the multiple versions of the source signal so that the transmitted multiple versions are separated in time from each other; and a receiver that is responsive to each of the transmitted multiple versions of the source signal, said receiver including means for delaying the multiple versions so that each version is aligned in time, said receiver further including means for combining the at least two versions of the source signal to form the complete digital data signal if the transmitted multiple versions are not blocked, said receiver further including means for reconstructing the complete digital data signal by using one of the at least two versions of the source signal to replace missing frames or channels in the complete digital data signal if the transmitted multiple versions are blocked.

14. The system according to claim 13 wherein the means for reconstructing the completed digital data signal includes means for cloning a left channel to be a right channel if a right channel is missing and cloning a right channel to be a left channel if the left channel is missing.

15. The system according to claim 13 wherein the means for reconstructing the digital data signal includes repeating available frames of digital data to replace a frame that is missing.

16. A system according to claim 13 wherein the means for reconstructing the digital data signal includes interpolating available frames of digital data to replace a frame that is missing.

17. The system according to claim 13 wherein the means for creating multiple versions of the source signal includes means for creating a first version of only even numbered frames with odd numbered frames missing and a second version of only odd numbered frames with even number of frames missing, and wherein the means for reconstructing the digital data includes using the odd numbered frames to provide the even number frames if the first version is blocked, and using the even numbered frames to provided the odd numbered frames if the second version is blocked.

18. The system according to claim 13 wherein the means for creating multiple versions of the source signal includes means for creating a first version including consecutive frames of only right channel digital data and a second version including consecutive frames of only left channel digital data, and wherein the means for reconstructing the complete data signal includes means for cloning a left channel to be a right channel if the first version is blocked and for cloning a right channel to be a left channel if the second version is blocked.

19. The system according to claim 13 wherein the means for creating multiple versions of the source signal includes means for creating four versions of the source signal, where each version includes providing a repetitive sequence of four frames of digital data, wherein a first version includes a first frame with only right channel digital data, a second frame with no digital data, a third frame with only left channel digital data and a fourth frame with no digital data; second version including a first frame of only left channel digital data, a second frame of no digital data, a third frame of only right channel digital data and a fourth frame of no digital data; a third version including a first frame of no digital data, a second frame of only right channel digital data, a third frame of no digital data and a fourth frame of only left channel digital data; and a fourth version including a first frame of no digital data, a second frame of only left channel digital data, a third frame of no digital data and a fourth frame of only right channel digital data, wherein the means for combining includes combining all four versions of the source signal to form the complete digital data signal, and wherein the means for reconstructing the complete digital data signal includes using the available right or left channel digital data to replace the missing frames or channels if one or more of the versions is blocked.

20. The system according to claim 13 wherein the means for creating multiple versions includes creating at least four versions where the digital data information in each version is one-fourth of the total digital data in the complete digital data signal.

21. The system according to claim 13 wherein the means for creating multiple versions of the source signal includes means for creating frames of digital data where each frame includes right channel digital data and left channel digital data, and wherein the digital data in each right channel and left channel is about one-half of a total digital data for the channel.

22. The system according to claim 21 wherein the means for combining the multiple versions includes means for providing complete right channel and left channel digital data in each of the frames, and the means for reconstructing includes using the one-half of the digital data as a complete signal if one of the versions is blocked.

23. The system according to claim 13 wherein the means for creating multiple versions of the source signal includes creating at least two of the versions of the source signal to have different levels of digital data quality, where the digital data quality is defined as a data bit rate over time.

24. A method of transmitting a source signal, said method comprising the steps of:

creating multiple versions of the source signal where at least two versions of the source signal provide different information of a complete source signal;

separating each of the multiple versions in time;

transmitting the multiple versions of the source signal so the transmitted multiple versions are separated in time from each other;

receiving each of the transmitted multiple versions of the source signal in a receiver and delaying the multiple versions in the receiver so that each version is aligned in time; and combining the at least two versions of the source signal to form the complete source signal if the transmitted multiple versions are not blocked and reconstructing the complete source signal using one of the at least two versions of the source signal to replace missing information to provide the complete source signal if the transmitted multiple versions are blocked.

25. The method according to claim 24 wherein the complete source signal is a digital data signal having consecutive frames of digital data where each frame includes a separate right channel and left channel.

26. The method according to claim 25 wherein the step of reconstructing the complete digital data signal includes cloning a left channel to be a right channel if a right channel is missing and cloning a right channel to be a left channel if the left channel is missing.

27. The method according to claim 25 wherein the step of reconstructing the digital data signal includes repeating available frames of digital data to replace a frame that is missing.

28. The method according to claim 25 wherein the step of reconstructing the digital data signal includes interpolating available frames of digital data to replace a frame that is missing.

* * * * *